Figure 1:
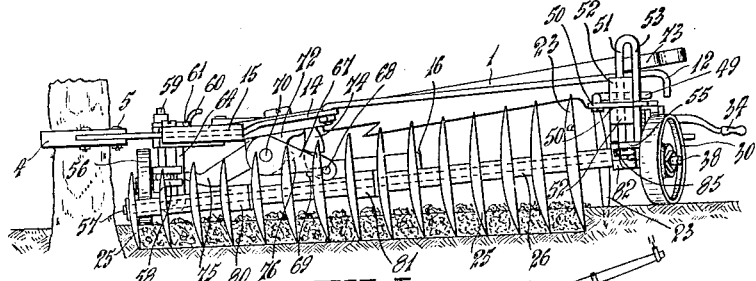

B. F. CRANWELL & W. J. ROBERTSON.
RADIAL CULTIVATOR.
APPLICATION FILED JUNE 3, 1914.

1,126,712.

Patented Feb. 2, 1915.
2 SHEETS—SHEET 1.

Witnesses:

B. F. Cranwell.
W. J. Robertson
Inventors

By
Attorney.

B. F. CRANWELL & W. J. ROBERTSON.
RADIAL CULTIVATOR.
APPLICATION FILED JUNE 3, 1914.
1,126,712.
Patented Feb. 2, 1915.
2 SHEETS—SHEET 2.
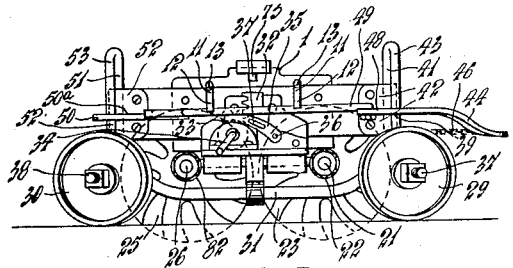
FIG. 5.
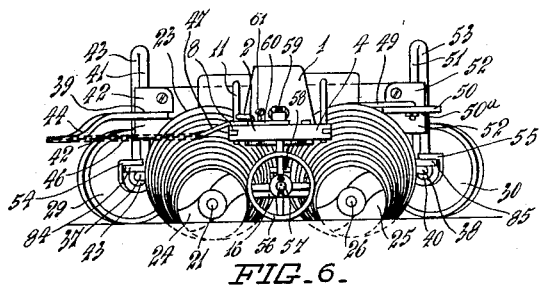
FIG. 6.
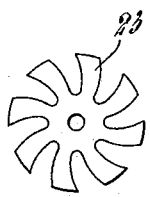
FIG. 7.
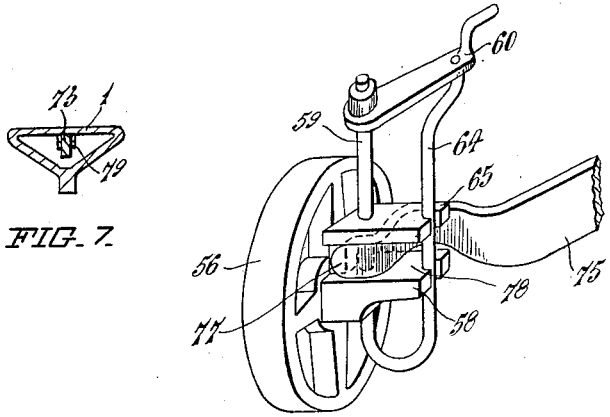
FIG. 8.
FIG. 9.
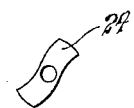
FIG. 10.
Witnesses.
Charles B Crompton
May G. Luttrell
B. F. Cranwell.
W. J. Robertson
Inventors
By Croydon Marks
Attorney.

UNITED STATES PATENT OFFICE.

BENJAMIN FRANKLIN CRANWELL AND WILLIAM JAMES ROBERTSON, OF AUCKLAND, NEW ZEALAND.

RADIAL CULTIVATOR.

1,126,712. Specification of Letters Patent. Patented Feb. 2, 1915.

Application filed June 3, 1914. Serial No. 842,762.

*To all whom it may concern:*

Be it known that we, BENJAMIN FRANKLIN CRANWELL and WILLIAM JAMES ROBERTSON, citizens of the Dominion of New Zealand, residing at 16 Custom street, Auckland, in the Provincial District of Auckland, in the Dominion of New Zealand, have invented certain new and useful Improvements in Radial Cultivators, of which the following is a specification.

The invention has for its object to facilitate the cultivation of ground around trees and near to the stems thereof. According hereto the tree is employed as a center post, a loop at one end of the implement encircling the stem and the cultivation being effected by rows of opposing spreading disks, carried from a frame which is drawn around the tree by a horse or motor.

The details of our invention are illustrated in the drawings, wherein:—

Figure 2:
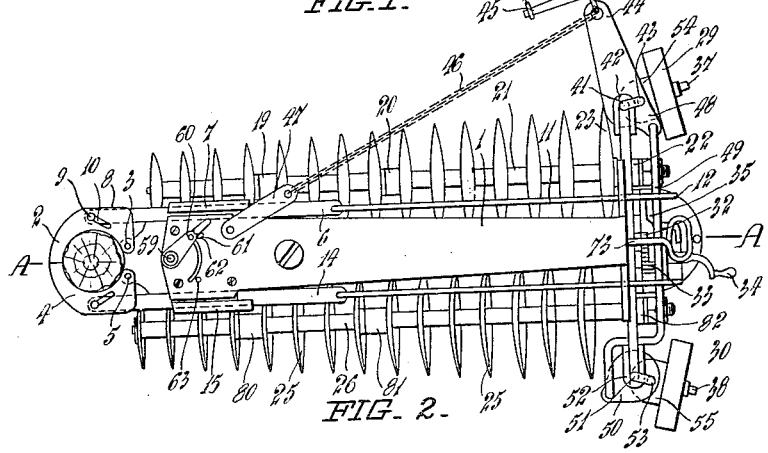
Figure 3:
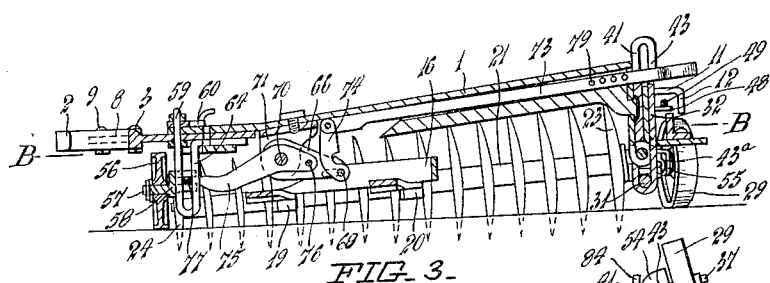
Figure 4:
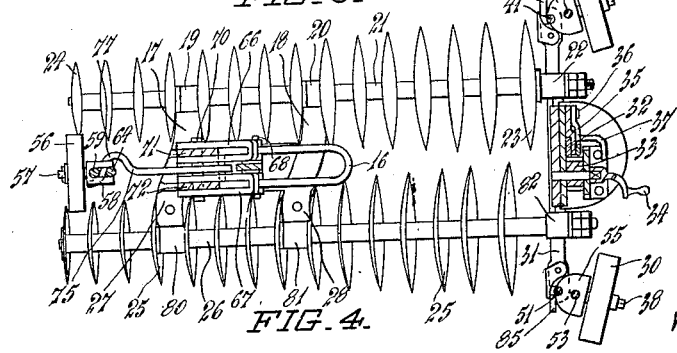

Figure 1 is a side elevation, and Fig. 2, a corresponding plan of the implement. Fig. 3, a side sectional elevation on A—A Fig. 2. Fig. 4, a sectional plan on B—B Fig. 3. Fig. 5, a front, and Fig. 6, a rear elevation corresponding to Fig. 1. Fig. 7, a cross section of the main member of the frame. Fig. 8, a perspective elevation of the rear land wheel and adjacent parts. Fig. 9, is an end elevation of one of the spading disks used at the front end, and Fig. 10, a similar view of the spading disk used at the rear end of the implement.

The main frame 1, (a cross section of which is shown in Fig. 7) has upon its rear end a loop in two sections consisting of a semicircular jaw 2, pivoted at 3, and a similar jaw 4, pivoted at 5. An operating rod 6, slides in a guide 7, upon the frame; its forward end passing into a horizontal slot 8, in the jaw 2, and having a projecting pin 9, which works in a vertical slot 10, in said jaw. A connecting rod 11, secured to rod 6, passes through a guide hole in the frame, has a handle 12, at its end and a notch 13, in its underside in which the frame may be engaged to hold the rod in desired position. Jaw 4, is operated by similar parts in a similar manner by a rod 14, working in guide 15. By the means above described either of the jaws may be opened independently to receive or leave a tree or both of them may be opened together. The under frame 16, has the lateral arms 17 and 18 upon the ends of which are bearing eyes 19 and 20, in which is revolubly mounted a spindle 21, its forward end being carried in a bearing 22, swiveled on the main frame. Concave spading disks fixed upon the spindle, are correlatively of regularly diminishing diameter, each series resembling in form a truncated cone, and have a proportionately lessening number of spading tines from the large disk 23 (see Fig. 9) at the forward end, to the smallest disk 24, (see Fig. 10) at the inner end of the implement. The varying diameters of the several disks is dependent upon the relative distances passed through in their travel around the tree. The corresponding concave spading disks 25 upon the other side of the frame are dished in opposite direction to the first mentioned disks and are fixed upon a spindle 26, which is journaled in bearings 80 and 81 upon the ends of the arms 27 and 28 and in a swivel bearing 82, upon the main frame in the manner of the same parts just described.

The axes of the spindles are not radial with the tree but are approximately parallel with an imaginary line drawn from the center of the tree along the middle of the frame, the spading effect of the tines being thereby increased.

The forward end of the frame may be supported upon land wheels 29 and 30 which revolve freely on arbors 37 and 38 respectively extending at right angles from the lower ends of vertical spindles 41 and 51 which are located at opposite ends of a transverse cranked axle 31 and are turnable pivotally therein. About the middle of the axle is a toothed rack 32 engaging a pinion 33 which is turnable by a cranked handle 34 whereby the height of the frame above the ground can be regulated at will. A pawl 35 pivoted at 36 and operable by a handle 37 engages the teeth of the pinion to maintain the rack in the desired position. Spindle 41 passes through a pair of guide eyes 42 in the main frame. A spindle 43 parallel with and connected at the top to spindle 41, and having an eye 43$^a$ fitting upon the arbor 37, passes through a coupling arm 44 freely mounted on spindle 41 and located in a slot 39 between said eyes and to the outer end of which is attached the draw bar 45 and a draft chain 46 leading to a draw arm 47 pivoted to near the rear end of the frame.

An extension 48 from arm 44 is connected by a cranked rod 49 with a coupling arm 50 located in a slot 50ª between a pair of guide eyes 52 upon the end of the frame and mounted upon and projecting rearwardly from the vertical spindle 51; which passes through said guide eyes and has connected to its upper end and parallel with it a spindle 53 which also passes through the arm 50 and at its lower end has an eye 40 fitting upon the arbor 38. By this means the wheels may be raised and lowered simultaneously by means of the rack referred to, while at any angle with the frame and will turn together in opposite directions to assume the correct angles for encircling the tree or for the travel of the implement when out of work, which travel will be in a direction longitudinal with the frame. To prevent the spindles 41 and 51 sliding through the ends of the axle, angle brackets 54 and 55 each have an eye fitting upon the arbors 37 and 38 respectively and an extension which fits over the top of the axle end. Projections 84 and 85 from the respective ends of the axle contact with the said spindles 43 and 53 and prevent the pivotal movement of the spindles 41 and 51 beyond the position when the land wheels are at right angles to the axle for transport purposes.

The rear end of the implement may be carried upon a land wheel 56 revolubly mounted upon a spindle 57 projecting from a bracket 58 slidable vertically on a rotatable spindle 59 turnable by a hand lever 60 which may be fixed by passing a pin 61 into one or other of the holes 62 or 63 in the frame. Spindle 59 is connected to or integrally formed with an upwardly projecting spindle 64, which is connected at its upper end to the hand lever 60 (see Fig. 8). Bracket 58 is caused to turn with spindles 59 and 64 by a jaw 65 integral with it, which receives and is guided by spindle 64.

The frame 16 is of U shape (see Fig. 4) and is connected to the main frame by bifurcated arms 66 and 67 each pivoted at one end upon a pin 68 which works in slot 69, in the frame and at their other ends are pivoted upon a pin 70 in eyes 71 and 72 projecting from the under side of the main frame. The main frame is raised and lowered relatively to the spindles which carry the spading disks, and, the land wheel 56 is depressible relatively to the frame so as to cause the spading disks to clear the ground for transport or other purposes, by a sliding rod 73, the rear end of which is pivotally connected to an arm 74 (see Figs. 1 and 3) pivoted at its lower end in the under frame on said pin 68 its upper end—when desired—bearing against the under side of the main frame and supporting the same. The raising or lowering of the frame effects the sliding of the bracket 58 (and with it the vertical adjustment of land wheel 56) by means of a bell crank lever 75 pivoted upon the pin 70 and having a pin 76 at its rear end which works in holes in the inner members of each of the bifurcated arms 66 and 67; at the end of the bell crank lever is a jaw 77 which engages a recess channel 78 in the bracket 58 (see Figs. 3, 4 and 8). The sliding rod 73 has a series of laterally projecting stud pins 79 (Fig. 3) a suitably shaped slot being formed in the end of the frame to permit of their passage when desired; by moving the rod laterally the metal of the frame can be made to engage between two of these studs and maintain the rod in position.

The height of the frame relatively to the several land wheels is preferably adjusted so that the spindles carrying the spading disks are at the angle which will bring the bottom edges of the spading disks in horizontal line (see Figs. 1 and 6) to produce a regular depth of tilth.

What we do claim and desire to secure by Letters Patent of the United States is:—

1. In an implement for the purpose indicated a frame in combination with a loop located at one end of said frame and adapted to encircle a tree, said loop being comprised of two sections pivoted on the frame, and rods, sliding on said frame, for independently operating said sections whereby the loop may be opened to receive and release the tree substantially as and for the purpose herein specified.

2. In an implement for the purpose indicated a frame in combination with a loop located at one end of said frame and adapted to encircle a tree, said loop being comprised of two sections each pivoted upon the frame and each having a slot in which works a pin projecting from the end of an operating slide rod substantially as and for the purpose herein specified.

3. An implement of the nature indicated wherein a frame has a loop at one end adapted to encircle a tree, two spindles arranged and located with their axes approximately parallel with an imaginary radial line drawn from the center of said tree through the frame, and a series of concave spading disks carried upon said spindles, said disks gradually and regularly increasing in size from the inner ends of said spindles to the outer ends thereof and the concavities of the disks upon one spindle being relatively opposite to the concavities of the disks on the other spindle substantially as and for the purpose herein specified.

4. In an implement of the nature indicated in combination a main frame, an under frame, connecting arms pivoted thereto, an arm pivoted at one end to the under frame, a slide rod guided in said main frame pivotally connected to the other end of said arm which is adapted to engage the underside of the main frame, substantially as and for the purpose herein specified.

5. In an implement of the nature indicated a land wheel located near the inner end of the frame, a bracket and a spindle projecting therefrom upon which said wheel is mounted, a vertical spindle upon which the bracket is slidable, a handle connected thereto, a second spindle connected to said vertical spindle, a jaw upon the bracket engaging said second spindle, a bell crank lever engaging the bracket and means for operating said lever, substantially as and for the purpose herein specified.

6. In an implement of the nature indicated a land wheel located near the inner end of the frame, a bracket, a spindle projecting therefrom upon which the bracket is slidable, a handle connected thereto, a second spindle connected to said vertical spindle, a jaw upon the bracket engaging said second spindle, a bell crank lever engaging the bracket, a main frame, and under frame, arms pivoted at their ends to each of said frames and a pin at the end of the bell crank lever engaging said arms with operable means for regulating the distance apart of said frames, substantially as and for the purpose herein specified.

7. In an implement of the nature indicated, a main frame, bearing eyes pivoted therein, spindles carrying spading disks, having one of their ends journaled in the respective eyes, a cranked axle, land wheels, one upon each end thereof, guide eyes on the frame, spindles one at each end of said axle, each passing through one of said eyes, a toothed rack connected to said axle, a pinion journaled in the main frame and engaged by said rack and a handle for turning the pinion, substantially as and for the purpose herein specified.

8. In an implement of the nature indicated a main frame, a cranked axle, land wheels upon each end thereof, vertical guiding means at each end of said axle, a toothed rack connected to the axle, a pinion journaled in the frame and engaged by the rack, turning means for the pinion, a pawl pivoted on the frame and engaging said pinion, and, a handle for turning the pawl on its pivot, substantially as and for the purpose herein specified.

9. In an implement of the nature indicated a main frame, a transverse axle, guide eyes in the frame, each end of the axle having a vertically moving spindle guided by a pair of said eyes, and pivoted in the axle, an arbor formed by a cranked extension from said spindle, a land wheel upon the arbor, a second spindle connected to the top of the vertical spindle and to said arbor, a coupling arm located between said eyes and passed through by each of said spindles and a cranked rod connecting the respective coupling arms, substantially as and for the purpose herein specified.

10. In an implement of the nature indicated a main frame, a transverse axle, guide eyes in the frame, each end of the axle having a vertically moving spindle guided by a pair of said eyes, and pivoted in the axle, an arbor formed by a cranked extension from said spindle, a land wheel upon the arbor, a second spindle connected to the top of the vertical spindle and to said arbor, a coupling arm located between said eyes and passed through by each of said spindles, a cranked rod connecting the respective coupling arms, a draw arm pivoted near the rear end of the frame, a draw bar connected to one of the said coupling arms and a chain connecting said draw arm to the draw bar of the implement, substantially as and for the purpose herein specified.

In testimony whereof we have signed our names to this specification in the presence of two witnesses.

B. F. CRANWELL.
W. J. ROBERTSON.

Witnesses:
WM. OLIPHANT,
A. L. FERNEYHOUGH.

Copies of this patent may be obtained for five cents each, by addressing the "Commissioner of Patents, Washington, D. C."